United States Patent [19]
Kaneko

[11] Patent Number: 5,454,526
[45] Date of Patent: Oct. 3, 1995

[54] SPEED CHANGE DEVICE FOR FISHING REEL

[75] Inventor: Kyoichi Kaneko, Tokyo, Japan

[73] Assignee: Daiwa Seiko, Inc., Tokyo, Japan

[21] Appl. No.: 240,806

[22] Filed: May 11, 1994

Related U.S. Application Data

[63] Continuation of Ser. No. 936,215, Aug. 27, 1992, abandoned.

[30] Foreign Application Priority Data

Sep. 13, 1991 [JP] Japan ................... 3-081929

[51] Int. Cl.⁶ .................................................. A01K 89/015
[52] U.S. Cl. ........................... 242/255; 74/371; 192/48.91
[58] Field of Search ................... 242/255; 74/370, 74/371, 366; 192/67 R, 48.91

[56] References Cited

U.S. PATENT DOCUMENTS

| | | | |
|---|---|---|---|
| 1,542,403 | 6/1925 | Miles | 242/255 |
| 2,150,088 | 3/1939 | White | 242/255 X |
| 2,812,840 | 11/1957 | Winter et al. | 192/48.91 |
| 3,424,286 | 1/1969 | Otterbach et al. | 192/48.91 |
| 4,271,942 | 6/1981 | Ballendux | 192/48.91 |
| 4,867,392 | 9/1989 | Sato | 192/48.91 |
| 5,058,447 | 10/1991 | Ikuta | 192/48.91 X |
| 5,149,308 | 9/1992 | Nakamura et al. | 74/371 X |
| 5,193,763 | 3/1993 | Sakaguchi | 242/255 |

FOREIGN PATENT DOCUMENTS 60-207539 10/1985 Japan .

Primary Examiner—Daniel P. Stodola
Assistant Examiner—Michael R. Mansen
Attorney, Agent, or Firm—Longacre & White

[57] ABSTRACT

A low speed gear (6) and a high speed gear (7) are fixed to a spool shaft (5) for rotating a spool (3). A low-speed driving gear (12) engaging with the low speed gear (6) and a high-speed driving gear (13) engaging with the high speed gear (7) are always held in an engagement state on an axially movable handle (9). Further, in the handle shaft (9) is provided an engaging member (14) engaging with engaging parts (10 and 11) respectively formed in the inside of the low-driving gear (12) and the high-speed driving gear (13). The engaging member (14) is selectively engaged with the engaging part (10 or 11) by axially moving the handle shaft (9) so that a fishing line is wound with a winding speed changed to high speed or to low speed.

6 Claims, 4 Drawing Sheets

SPEED CHANGE DEVICE FOR FISHING REEL

This is a continuation of application Ser. No. 07/936,215, filed Aug. 27, 1992, which was abandoned upon the filing hereof.

BACKGROUND OF THE INVENTION

The present invention relates to an improvement for a speed change device used in a double bearing type fishing reel.

As disclosed in Japanese Unexamined Patent Publication No. 60-207539, there has been known a speed change device for a double bearing type fishing reel in which a handle shaft is axially moved so that the winding speed of a fishing line can be selectively changed to low speed and to high speed.

However, since, in accordance with the above mentioned speed change device, a gear fixed to an end part of a handle shaft is adapted to selectively engage with internal teeth of a high-speed winding ring gear or with a low-speed winding gear on a spool shaft through the axial movement of the handle shaft so that the winding speed of a fishing line is changed over to high speed or to low speed. Therefore, there have been problems in that teeth portions are liable to be broken because of a change-over operation, the change-over operation is not smoothly carried out and engagement accuracy is deteriorated in due to use for a long time.

SUMMARY OF THE INVENTION

Therefore, an object of the present invention is to provide a speed change device for a fishing reel which overcomes the deficiencies of the prior art and is capable of freely changing the winding speed of a fishing line to high or low speed while gears of high and low speed are kept in engagement state.

In order to attain the above mentioned object, a speed change device for a fishing reel in accordance with the present invention preferably includes a spool; a spool shaft for rotating the spool; a low speed gear and a high speed gear respectively provided on the spool shaft; a handle shaft supported movably in the axial direction; a low-speed driving gear and a high-speed driving gear respectively engaging with the low speed gear and the high speed gear and rotatably supported on the handle shaft; engaging parts respectively formed in the inside of the low-speed driving gear and the high-speed driving gear; and an engaging member provided on the handle shaft and capable of freely and selectively engaging with the respective engaging parts of the high-speed driving gear and the low-speed driving gear in accordance with the axial moving operation of the handle shaft.

It is preferable that a change-over operation can be easily and rapidly performed in an appropriate manner so as to engage and retain the handle shaft respectively in a high-speed winding position and a low-speed winding position by a change-over operating member.

With this construction, when a fishing line is wound at high speed on a spool, the engaging member of the handle shaft is engaged with the engaging part of the high-speed driving gear so that the rotation of the handle shaft is transmitted to the spool shaft through the engaging member, the engaging part, the high-speed driving gear and the high speed gear, sequentially. When the fishing line is wound at low speed, the handle shaft is axially moved and the engaging member thereof is engaged with the engaging part of the low-speed driving gear so that the rotation of the handle shaft is transmitted from the engaging member to the spool shaft through the low-speed driving gear and the low speed gear to thereby rotate the spool shaft.

BRIEF DESCRIPTION OF THE DRAWINGS

Other features and advantages of the present invention will be apparent from the following description taken in connection with the accompanying drawings, in which.

DETAILED DESCRIPTION OF THE PREFERRED EMBODIMENT

Figure 1:
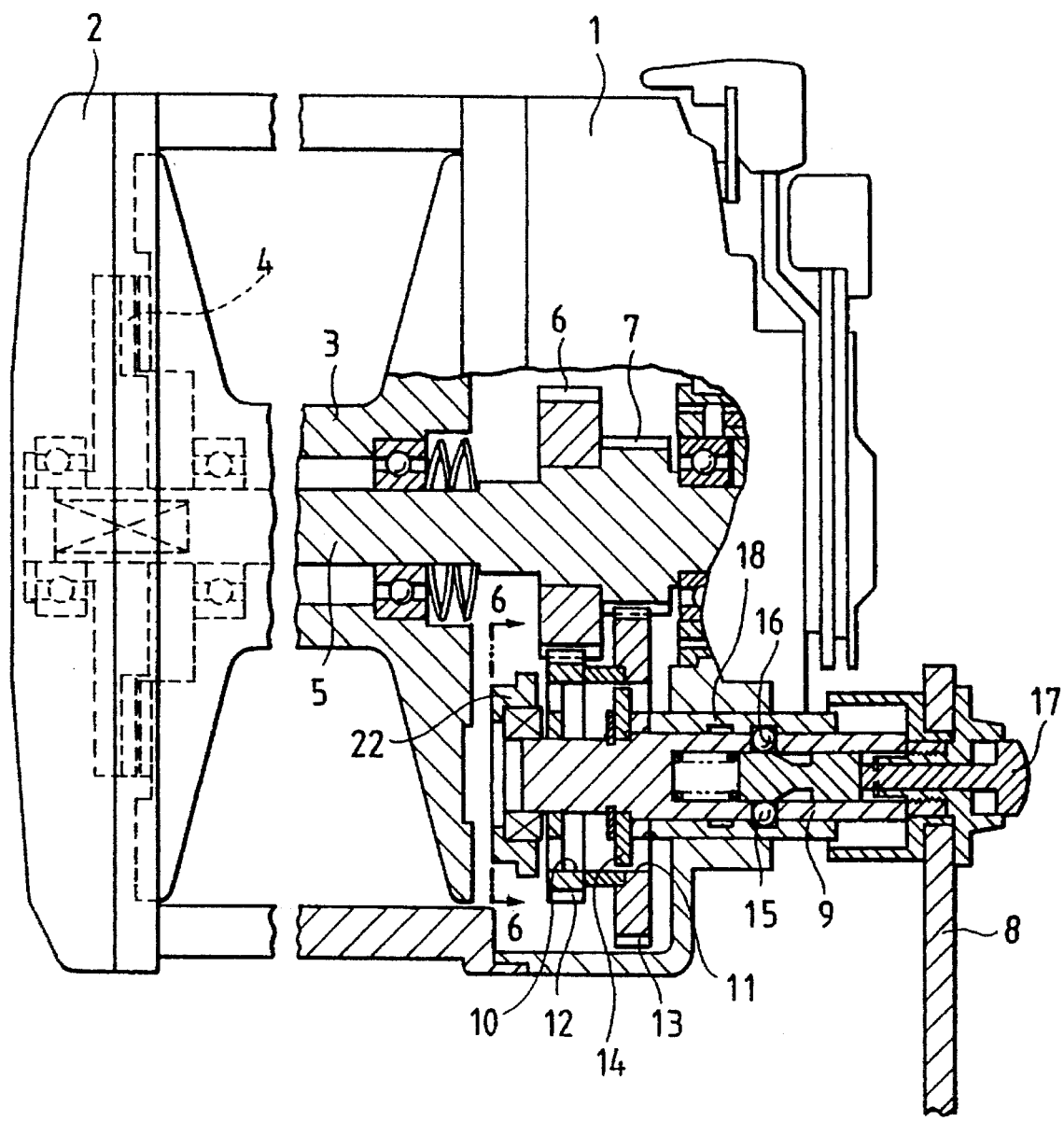
FIG. 1 is a partly fragmentary front view of a speed change device for a fishing reel according to the present invention.

An embodiment of the present invention will be described with reference to the drawings.

A spool shaft 5 is supported between reel side plates 1 and 2, rotates a spool 3 through a braking mechanism 4 or is directly connected to the spool 3 to rotate it. A low speed gear 6 and a high speed gear 7 are fixed to the spool shaft 5. A handle shaft 9 having a handle 8 is supported on the reel side plate 1 so as to be axially movable. A low-speed driving gear 12 and a high-speed driving gear 13 are rotatably fitted onto an inner end part of the handle shaft 9 and retained in place. The low-speed driving gear 12 is engaged with the low speed gear 6 and provided with an engaging part 10 at its inner circumference. The high-speed driving gear 13 is engaged with the high speed gear 7 and provided with an engaging part 11 at its inner circumference.

An engaging member 14 is provided on the handle shaft 9 so as to be engaged with the engaging part 10 of the low-speed driving gear 12 when the handle shaft 9 is moved to an inside position and with the engaging part 11 of the high-speed driving gear 13 when the handle shaft 9 is moved to an outside position. The handle shaft 9 is formed with through-holes 16 into which engaging balls 15 are fitted. The engaging balls 15 are selectively engageable with engaging recessed parts 19 and 20 formed on a handle support shaft 18 through the manipulation of a change-over operating member 17 so that the handle shaft 9 can be retained in its inside position and in its outside position. A spring 21 serve to urge the change-over operating member 17. A support 22 is secured to the reel side plate 1 for supporting the end of handle shaft 9. A holding ring 23 holds the low-speed and high-speed driving gears 12 and 13.

Figure 7:
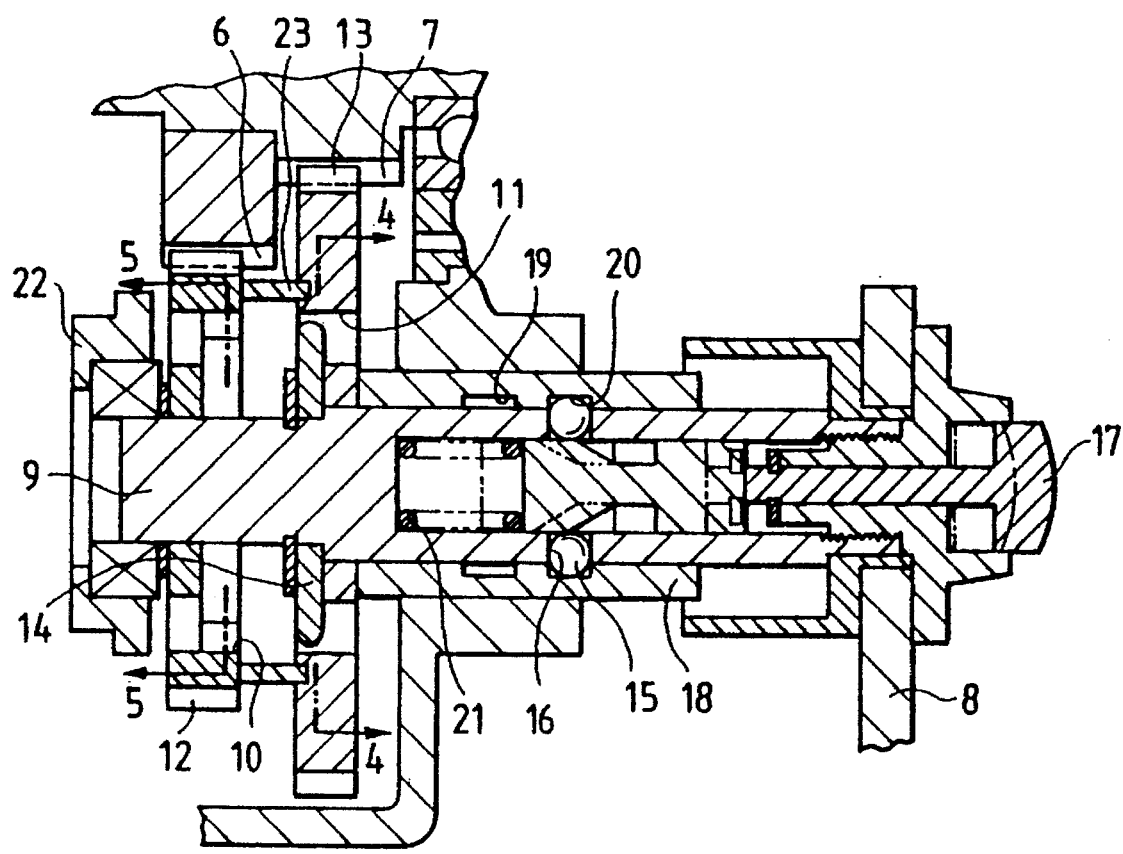
FIG. 7 is a sectional view showing a speed change mechanism for a fishing reel according to the present invention, in which an engaging member formed with a plurality of hemispherical protrusions is used.

As shown in the drawings, the engaging member 14 is formed with a plurality of semicylindrical protrusions whereas the low-speed driving gear 12 and the high-speed driving gear 13 have a plurality of semicylindrical recesses which serve as the engaging parts 10 and 11, respectively. The engaging member 14 may be formed with a plurality of hemispherical protrusions as shown in FIG. 7.

Figure 2:
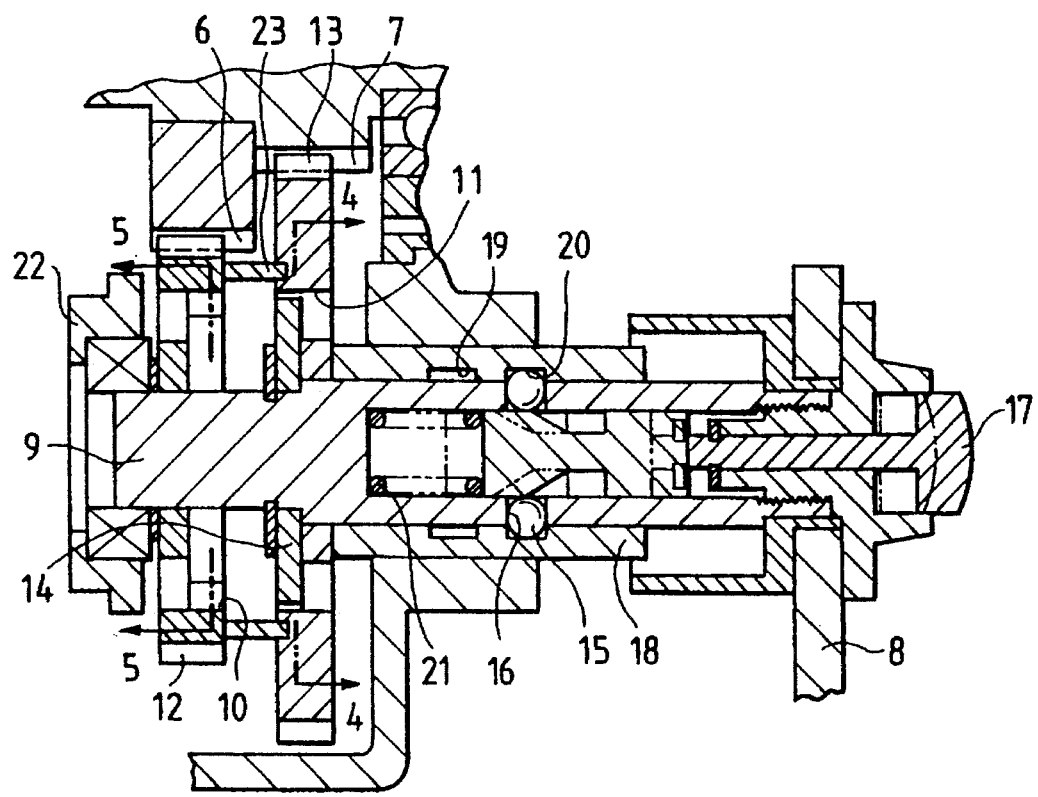
FIG. 2 is a longitudinally sectional front view of the speed change device for the reel of the invention in a high-speed winding state.
Figure 3:
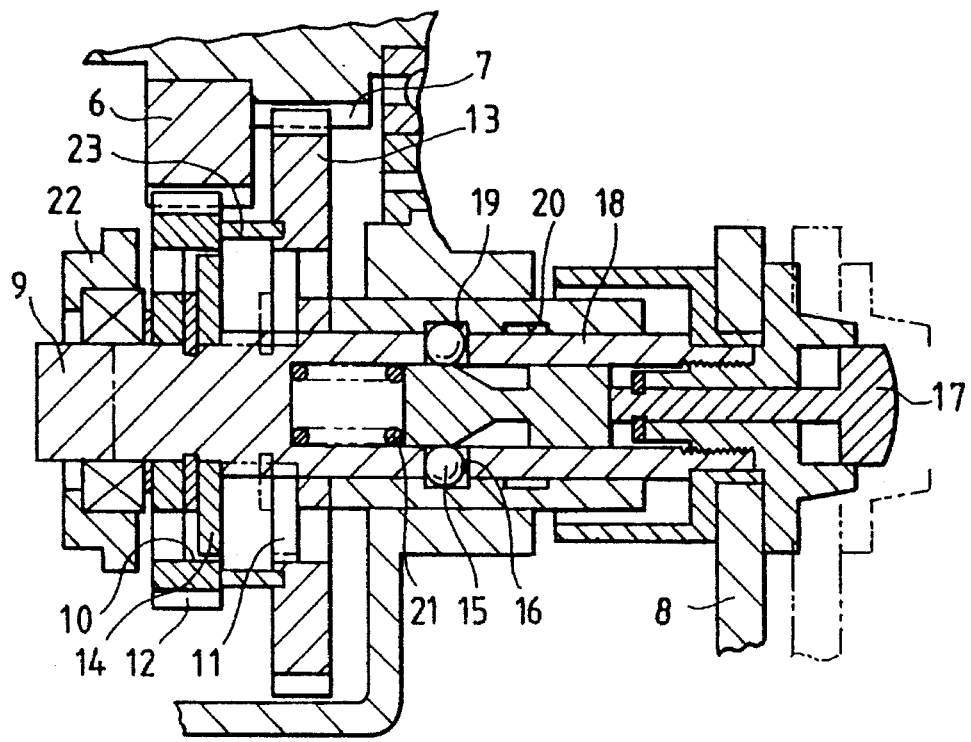
FIG. 3 is a longitudinally sectional front view of the speed change device for the reel of the invention in a low-speed winding state.
Figure 4:
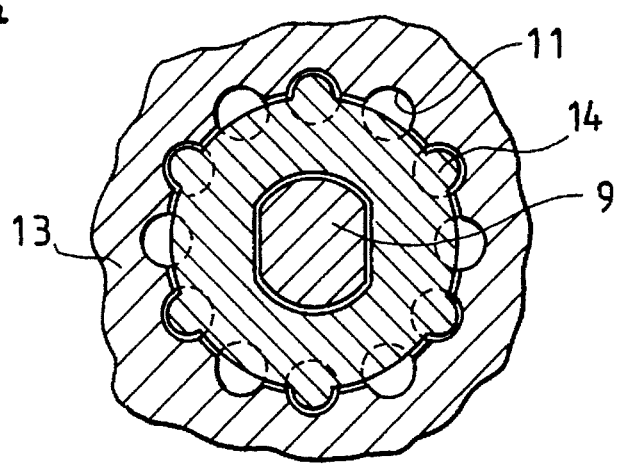
FIG. 4 is a sectional view taken along a line 4—4 of FIG. 2.
Figure 5:
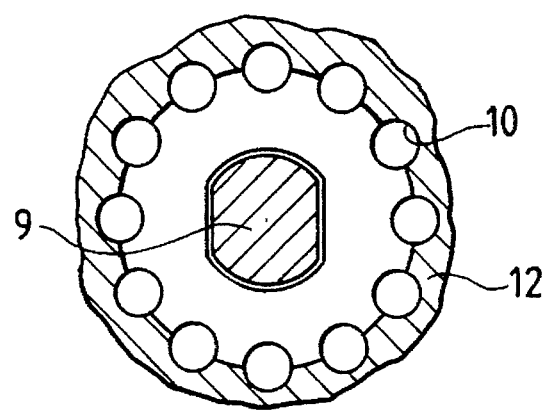
FIG. 5 is a sectional view taken along a line 5—5 of FIG. 2.
Figure 6:
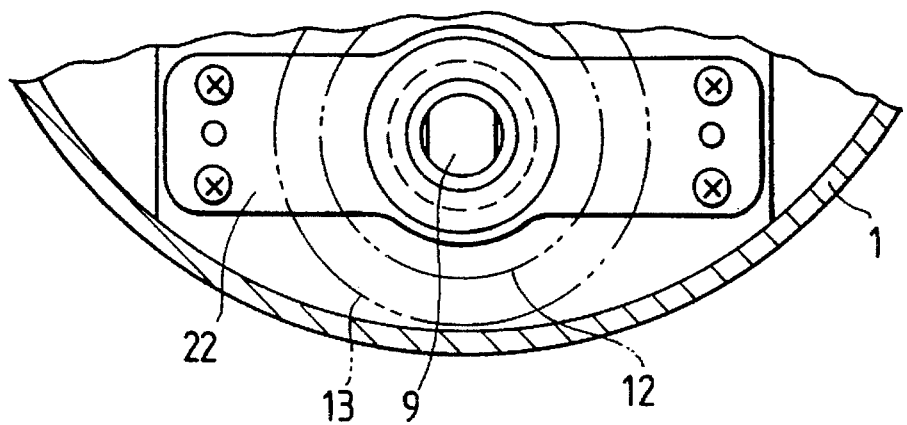
FIG. 6 is a sectional view taken along a line 6—6 of FIG. 1.

Since the speed change device for the fishing reel according to the embodiment of the invention is constructed as mentioned above, when the engaging balls 15 are engaged in the engaging recessed parts 20 by the change-over operating member 17 so that the handle shaft 9 is retained at the outside position, as shown in FIG. 2, the engaging member 14 engages with the high-speed driving gear 13. Then, the rotation of the handle shaft 9 is transmitted through the high-speed driving gear 13, the high speed gear 7 and the spool shaft 5 so that the spool 3 is rotated and a fishing line is wound at high speed. When the handle shaft 9 is moved to and retained in the inside position so that the engaging balls 15 are engaged in the engaging recessed parts 19 by the change-over operating member 17, as shown in FIG. 3, the engaging member 14 is engaged with the low-speed driving gear 12 and the rotation of the handle shaft 9 is transmitted through the low-speed driving gear 12, the low speed gear 6 and the spool shaft 5 to thereby rotate the spool 3 and wind the fishing line at low speed.

As mentioned above, according to the present invention, since the fishing line winding speed can be changed to low speed and to high speed while the low-speed driving gear and the high-speed driving gear of the handle shaft are respectively engaged with the low speed gear and the high speed gear of the spool shaft, teeth portions of the gears are not subjected to breakage as in the prior art and a change-over operation can be smoothly carried out. Therefore, in the case where the speed change device of invention is employed for a long time, engagement accuracy can be maintained with high reliability and a winding operation can be always smoothly and easily carried out.

The present invention is not confined to the embodiment described above, but may be embodied or practiced in other various ways without departing the spirits or essential of the invention.

What is claimed is:

1. A speed change device for a fishing reel, comprising:

a spool having a spool shaft;

a low speed gear and a high speed gear provided on the spool shaft for rotating said spool;

a handle shaft for inputting a rotation and supported movably in the axial direction by a casing;

a low-speed driving gear and a high-speed driving gear respectively engaging with the low speed gear and the high speed gear and rotatably supported on the handle shaft;

engaging parts respectively formed in the inside portions of said low-speed driving gear and said high-speed driving gear; and an engaging member fixed on said handle shaft and capable of freely and selectively engaging with one of said engaging parts of said high-speed driving gear and said low-speed driving gear in accordance with the axial movement of said handle shaft, wherein said engagement member is generally formed as a circular member to define a radial circumference, and wherein a plurality of protrusions are integrally formed on said radial circumference to extend in a radial direction for engagement with said engaging parts.

2. A speed change device for a fishing reel, comprising:

a casing;

a first shaft rotatably supported by said casing for inputting a rotation, said first shaft is axially movable between first and second positions;

a second shaft rotatably supported by said casing for outputting said rotation;

a first gear non-rotatably fixed on said second shaft;

a second gear non-rotatably fixed on said second shaft;

a third gear rotatably fitted around said first shaft and kept in engagement with said first gear for transmitting said rotation from said first shaft to said second shaft to rotate said second shaft at a predetermined high speed;

a fourth gear rotatably fitted around said first shaft and kept in engagement with said second gear for transmitting said rotation from said first shaft to said second shaft to rotate said second shaft at a predetermined low speed; and engagement means for selectively coupling said first shaft and one of said third and fourth gears to rotate together, said engagement means includes an engagement member non-rotatably fixed on said first shaft, said engagement member is engaged with said third gear when said first shaft is in said first position and engaged with said fourth gear when said first shaft is in said second position; and change-over means for selectively moving said first shaft between said first and second positions, said change-over means comprising a locking means for locking said first shaft relative to said casing and a disengagement means for disengaging said locking means, said disengagement means being axially movable with respect to said first shaft.

3. The speed change device according to claim 2, wherein said engagement means includes a first engagement part formed on an inner circumference of said third gear and a second engagement part formed on an inner circumference of said fourth gear.

4. The speed change device according to claim 3, wherein said engagement member has a plurality of hemispherical protrusions and said first and second engagement parts are formed into semicylindrical recesses.

5. The speed change device according to claim 3, wherein said engagement member has a plurality of semicylindrical protrusions and said first and second engagement parts are formed into semicylindrical recesses.

6. The speed change device according to claim 2, further comprising:

means for selectively retaining said first shaft in one of said first and second positions.

* * * * *